United States Patent [19]
Hill et al.

[11] Patent Number: 6,078,981
[45] Date of Patent: Jun. 20, 2000

[54] TRANSACTION STALL TECHNIQUE TO PREVENT LIVELOCK IN MULTIPLE-PROCESSOR SYSTEMS

[75] Inventors: David L. Hill, Cornelius; Chinna Prudvi; Derek T. Bachand, both of Portland; Paul Breuder, Beaverton; Matthew A. Fisch, Portland, all of Oreg.

[73] Assignee: Intel Corporation, Santa Clara, Calif.

[21] Appl. No.: 08/999,244

[22] Filed: Dec. 29, 1997

[51] Int. Cl.[7] .................................................... G06F 13/14
[52] U.S. Cl. ............................................. 710/200; 711/152
[58] Field of Search ..................................... 710/200, 240, 710/244, 36, 45; 711/147, 150–152

[56] References Cited

U.S. PATENT DOCUMENTS

| | | | |
|---|---|---|---|
| 4,587,609 | 5/1986 | Boudreau et al. | 710/200 |
| 4,805,106 | 2/1989 | Pfeifer | 711/152 |
| 4,937,733 | 6/1990 | Gillett, Jr. et al. | 710/108 |
| 5,175,837 | 12/1992 | Arnold et al. | 711/152 |
| 5,283,870 | 2/1994 | Joyce et al. | 711/152 |
| 5,297,269 | 3/1994 | Donaldson et al. | 711/145 |
| 5,367,695 | 11/1994 | Narad et al. | 709/210 |
| 5,404,482 | 4/1995 | Stamm et al. | 711/145 |
| 5,404,483 | 4/1995 | Stamm et al. | 711/144 |
| 5,408,629 | 4/1995 | Tsuchiya et al. | 711/151 |
| 5,442,755 | 8/1995 | Shibata | 710/108 |
| 5,499,356 | 3/1996 | Eckert et al. | 711/152 |
| 5,655,100 | 8/1997 | Ebrahim et al. | 711/144 |
| 5,669,002 | 9/1997 | Buch | 710/200 |
| 5,678,026 | 10/1997 | Vartti et al. | 711/152 |
| 5,737,759 | 4/1998 | Merchant | 711/146 |
| 5,740,401 | 4/1998 | Hanawa et al. | 711/152 |
| 5,832,276 | 11/1998 | Feiste et al. | 710/240 |

OTHER PUBLICATIONS

"Pentium® Pro Family Developer's Manual," vol. 1: Specifications, 1996, Chapters 4, Bus Protocol.
"Pentium® Pro Family Developer's Manual," vol. 1: Specifications, 1996, Chapters 7, Cache Protocol.
Pentium® Pro Processor System Architecture, Chapeter 10, Mindshare, Inc., Tom Shanley, 1997.

*Primary Examiner*—Ayaz R. Sheikh
*Assistant Examiner*—Sumati Lefkowitz
*Attorney, Agent, or Firm*—Kenyon & Kenyon

[57] ABSTRACT

A livelock preventative measure is provided for agents in a multi-processor computing system. Livelock may occur when multiple agents each trade ownership of data in an attempt to modify it. When livelock occurs, a first agent posts a bus transaction for a data and, if a second agent posts a bus transaction for the same data, the first agent may stall the bus transaction of the second agent until the first agent has completed its operation on the data.

15 Claims, 3 Drawing Sheets

TRANSACTION STALL TECHNIQUE TO PREVENT LIVELOCK IN MULTIPLE-PROCESSOR SYSTEMS

BACKGROUND OF THE INVENTION

1. Field of the Invention

The present invention relates to a livelock preventative measure in multiprocessor environments.

2. Related Art

Livelock conditions occur in multiprocessor environments when two agents vie for data at the same memory address. Such conditions occur infrequently but, when they occur, they prevent the system from making forward progress. Control of the data is swapped between the two processors while each waits for the other to complete its operation. Because neither processor is able to complete its respective operation, neither processor makes forward progress.

A processor communicates with external memories and devices via an external bus. In multi-agent systems, a plurality of processor devices may be connected to the external bus. An "agent" may be considered any device, memory or processor that is connected to the external bus.

A transaction is a set of bus activities related to a single bus request. For example, in the known Pentium® Pro processor, commercially available from Intel Corporation, a transaction proceeds through six phases:

Arbitration, in which an agent becomes the bus owner,

Request, in which a request is made identifying an address,

Error, in which errors in the request phase are identified,

Snoop, in which cache coherency checks are made,

Response, in which the failure or success of the transaction is indicated, and

Data, in which data may be transferred.

Other processors may support transactions in other ways.

In multiple agent systems, the external bus may be a pipelined bus. In a pipelined bus, several transactions may progress simultaneously provided the transactions are in mutually different phases. Thus, a first transaction may be started at the arbitration phase while a snoop response of a second transaction is being generated and data is transferred for a third transaction. However, a given transaction generally does not "pass" another in the pipeline.

Cache coherency is an important feature of a multiple agent system. If an agent is to operate on data, it must confirm that the data it will read is the most current copy of the data that is available. In such multiple agent systems, several agents may operate on data from a single address. Oftentimes when a first agent desires to operate on data at an address, a second agent may have cached a copy of the data that is more current than the copy resident in an external memory. The first agent should read the data from the second agent rather than from the external memory. Without a means to coordinate among agents, an agent may perform a data operation on stale data.

In the snoop phase, the agents coordinate to maintain cache coherency. In the snoop phase, each of the agents reports whether it possesses an unmodified copy of the data or whether it possesses a modified ("dirty") copy of the data at the requested address. In the Pentium® Pro, an agent indicates that it possesses an unmodified copy of the data by asserting a HIT# pin in a snoop response. An agent indicates that it possesses a dirty copy of the requested data by asserting a HITM# pin. If dirty data exists, it is more current than the copy in memory. Thus, dirty data will be read by an agent from the agent possessing the dirty copy. Non-dirty data is read by an agent from memory. Only an agent that possesses a copy of data at the requested address drives a snoop response; if an agent does not possess such a copy, it generates no snoop response.

A snoop response is expected from all agents at a predetermined point in a transaction. Occasionally, an agent cannot respond to another agent's request before the period closes. When this occurs, the agent may generate a "snoop stall" response that indicates that the requesting agent must wait longer for snoop results. In the Pentium® Pro processor, the snoop stall signal occurs when an agent toggles both outputs HIT# and HITM# from high to low in unison.

A livelock condition occurs when two agents snoop to the same address almost simultaneously in an attempt to read or manipulate data at that address. To process an instruction, a first agent snoops to an address specified in the instruction. Initially, no other agent owns data at that address and the first agent reads the data in from the external memory. Before the first agent can manipulate the requested data, a second agent requests data at the same address. The first agent indicates its ownership of the contested data and cedes ownership to the second agent. The first agent does not complete the instruction that caused it to read in the contested data. In fact, the first agent may not have read the data—the second agent's request for the contested data may have divested the first agent's ownership before the first agent read it at the data phase of its earlier request.

After the first agent cedes control, it determines which instruction to process next. It identifies the original instruction. Accordingly, the first agent requests the data that it just conveyed away. The second agent responds to the request by indicating its ownership of the address and conveys the data back to the first agent. Of course, the second agent was unable to complete its desired operation on the data. The first and second agents will snoop the data away from each other indefinitely, causing a livelock condition.

As is known, processors typically perform many instructions in the time that it takes to execute one bus transaction on the external bus. Some instructions may require the processor to read data via the external bus, others may not. Accordingly, wherever possible, processors schedule instructions so that, when data for a first instruction is being read to the processor, other unrelated instructions may be processed. When a livelock condition occurs, the processor typically exhausts all instructions that are unrelated to the instruction that is subject to the livelock. In this case, the processor stalls because it cannot execute the one instruction that is subject to the livelock.

Thus, there is a need in the art for a means to prevent livelock conditions in multi-agent systems.

SUMMARY OF THE INVENTION

The present invention provides a livelock preventative measure in multi-agent systems. According to embodiments of this measure, data is read to an agent. Requests for the data received from other agents are stalled until the agent has used the data at least once.

DETAILED DESCRIPTION

Figure 1:
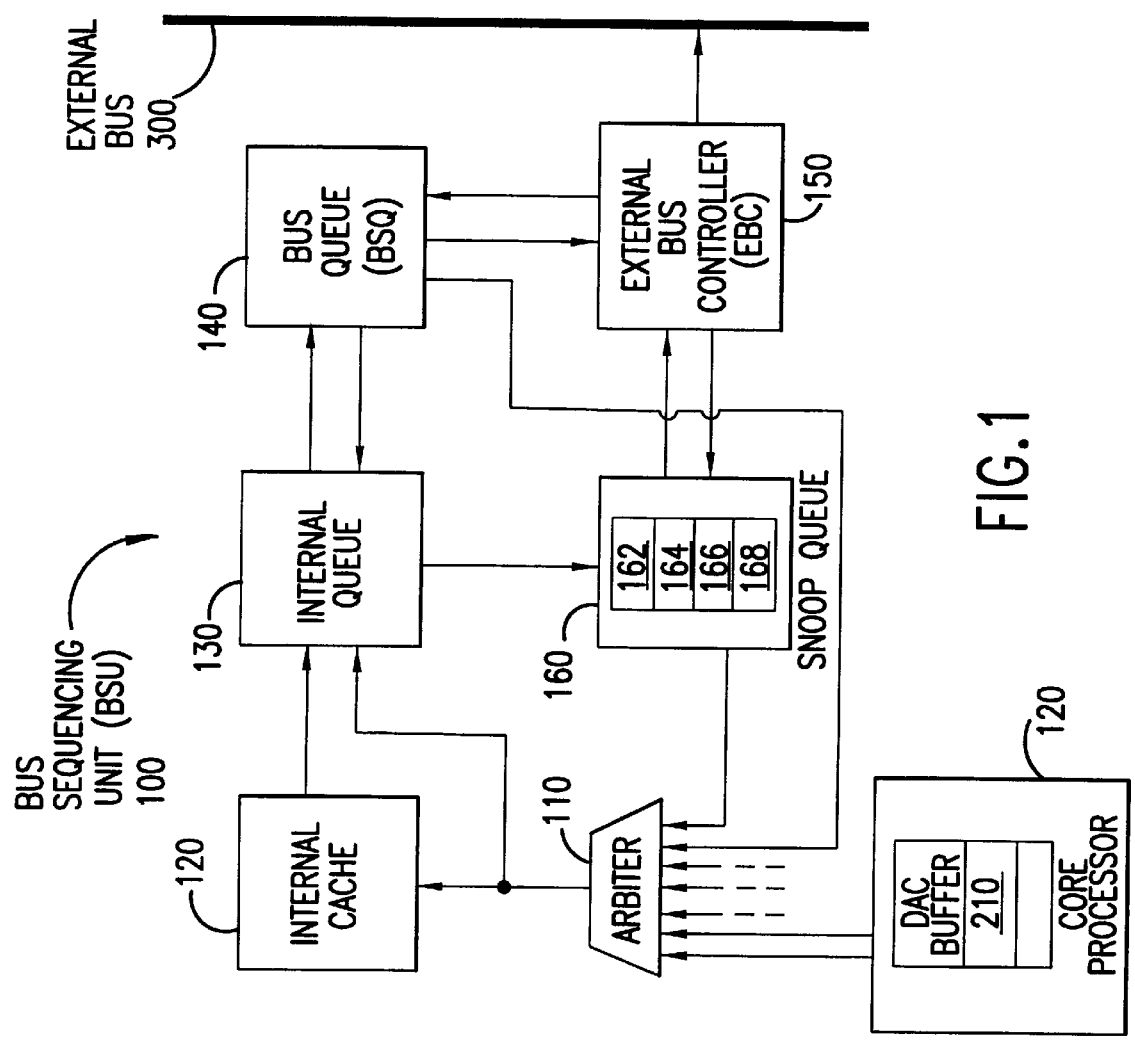
FIG. 1 is a block diagram of a processor core and a bus sequencing unit constructed in accordance with an embodiment of the present invention.

Turning to FIG. 1, there is shown a bus sequencing unit 100 ("BSU") and a processor core 200 constructed in accordance with an embodiment of the present invention. As is known, the processor core 200 executes instructions. It submits requests to the BSU 100 for data and instructions to be read to or written from the core 200. The core 200 is populated by a Data Address Controller (DAC) buffer 210 that stores requests issued by the core 200. Requests from the core 200 identify an address of requested data as well as a DAC buffer identifier. When the request is fulfilled, the core 200 clears the DAC buffer 210.

The BSU 100 includes an arbiter 110 that receives requests from a variety of elements both within and outside the BSU 100. The arbiter 110 receives the requests from the core 200. It also receives requests from other elements of the processor. When the arbiter 110 receives two or more requests at once, it selects among the requests according to a predetermined priority scheme. The arbiter 110 grants the selected request and denies the remainder. The selected request is output from the arbiter 110 to an internal cache 120 and an internal queue 130.

The internal cache 120 is a memory that stores both instructions and data. The internal cache 120 serves as an intermediate memory for use by the processor. It is external to the processor core 200 and, thus, slower than a cache provided within the core 200. Typically, however, it is larger than core caches. The internal cache 120 is internal to the processor and provides faster response than memories reached via the external bus 300.

The internal queue 130 fields requests issued by the arbiter 110 and determines how to service them. The internal queue 130 determines whether the request may be fulfilled by the internal cache 120 or whether resort to the external bus 300 is required. When the request may be serviced internally, as when requested data is present in the internal cache 120, the internal queue 130 services the request. When the request must be fulfilled by the external bus 300, the internal queue 130 refers the request to the bus sequencing queue 140.

The bus sequencing queue 140 ("BSQ") tracks transactions as they progress on the external bus 300. The BSQ 140 interfaces with an external bus controller 150 ("EBC") and the internal queue 130. The BSQ 140 fields requests that cannot processed by the internal cache 120, fulfills them via the external bus 300 and causes the processor caches to be updated as appropriate. The BSQ 140 stores the request in a queue (not shown) with the DAC identifier.

The BSU 100 also provides a snoop queue 160. The snoop queue 160 performs the cache coherency checking. It fields requests from agents and coordinates with the various caches present in the processor to determine whether a request implicates data held therein. The snoop queue 160 is populated by a plurality of queue buffers 162–168 storing requests.

Figure 2:
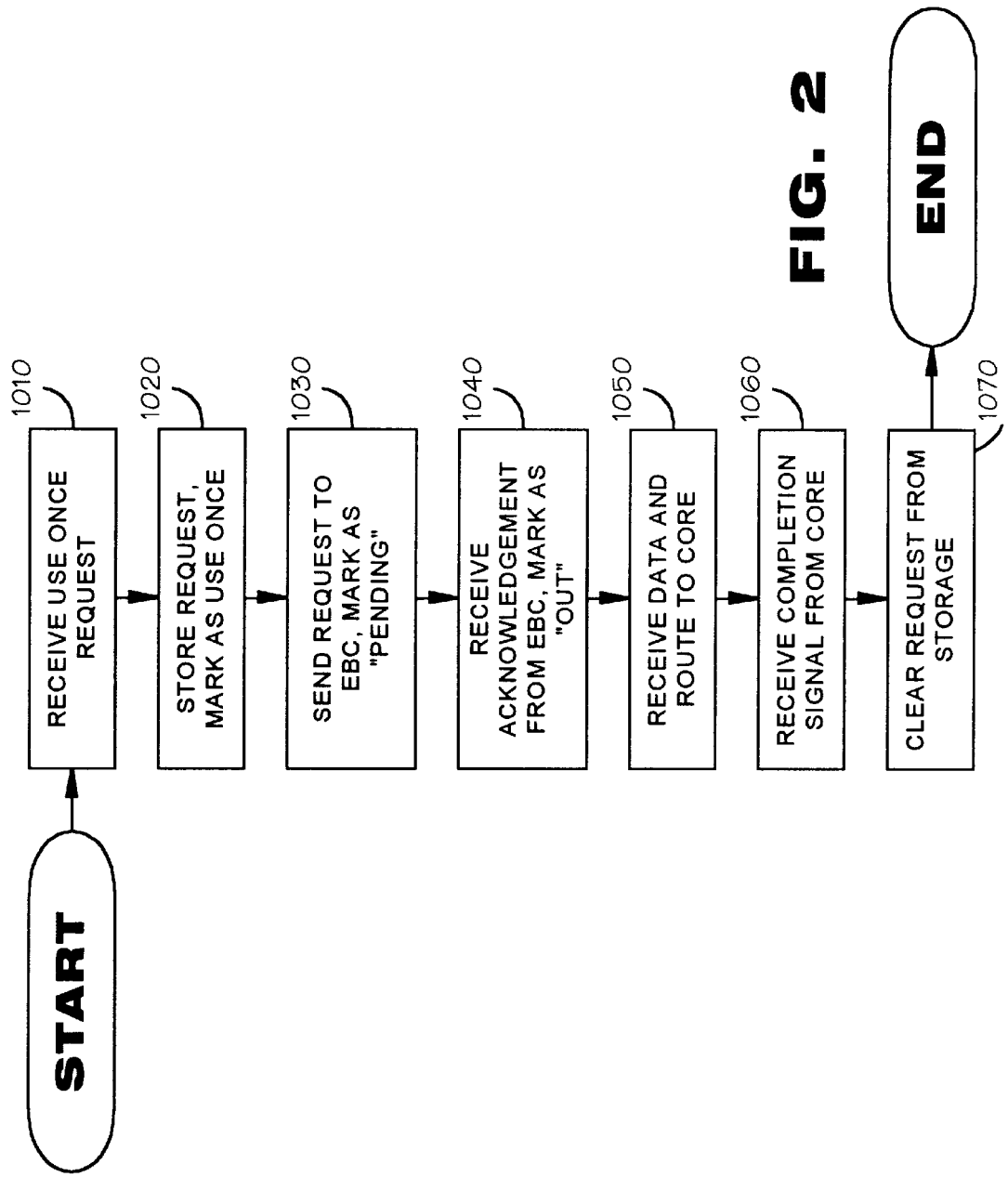
FIG. 2 is a flow diagram illustrating a method of operation of a bus sequencing queue according to an embodiment of the present invention.

The present invention provides a livelock preventative measure, an embodiment of which is shown in FIG. 2. A livelock condition occurs when the core 200 must execute one instruction before it may process any other instruction. In this case, all instructions that are unrelated to the "livelocked instruction," the instruction requesting the contested data, have been exhausted by the core 200. It issues a "use once" request—a request for the data that identifies that the request is assigned a priority. The request's priority may be identified by the core 200 in a marking bit of the request. The use once request propagates through the BSU 100 to the BSQ 140. When the core receives the contested data and uses it at least once, the core 200 signals the BSQ 140 and the snoop queue 160.

The BSQ 140 receives the use once request (Step 1010) and stores it in queue (Step 1020). The BSQ 140 sends the request to the EBC 150, typically as a traditional request (without the marking bit), and marks the request as "pending" in the queue (Step 1030). When the BSQ 140 receives an acknowledgment from the EBC 150 that the request has been placed on the external bus 300, the BSQ 140 updates the request's status in queue from pending to "out" (Step 1040). Sometime later, the transaction advances to the data phase. Data is transferred to the BSQ 140 from the external bus 300. The BSQ 140 routes the data to the core 200 based upon the DAC identifier of the request (Step 1050).

Normally, if the request were not a use once request, the BSQ 140 clears the request from the BSQ 140 upon completion of step 1050. However, the BSQ 140 maintains the use once request in queue until it receives the signal from the core 200 that the data has been used at least once (Step 1060). The BSQ 140 clears the request only after it receives the signal from the core 200 (Step 1070).

Figure 3:
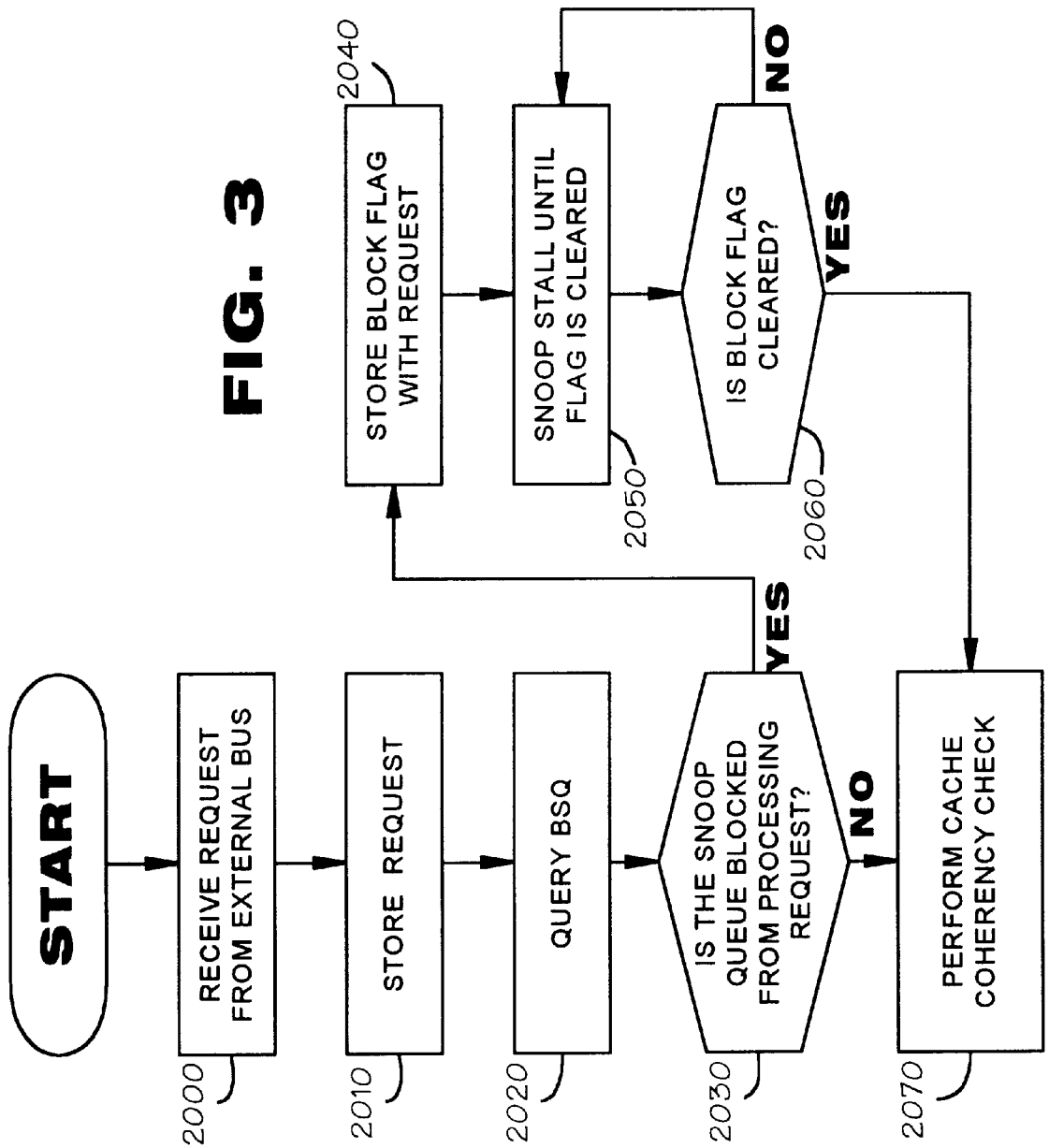
FIG. 3 is a flow diagram illustrating a method of operation of a snoop queue according to an embodiment of the present invention.

In an embodiment of the present invention, the snoop queue 160 operates in accordance with the method of FIG. 3. The snoop queue 160 monitors requests on the external bus 300. When a request is made, the snoop queue 160 receives the request from the EBC 150 (Step 2010). The snoop queue 160 stores the request in a queue. It also queries the BSQ 140 to determine whether it is blocked from performing a cache coherency check based upon the data identified in the request (Step 2020). If the request is a use once request and the BSQ 140 has marked the request as "out," the snoop queue 140 is blocked (Step 2030). The snoop queue 160 marks the request as blocked in its own queue (Step 2040), typically by asserting a marking bit, and asserts a snoop stall on the external bus 300 until the flag is cleared (Step 2050). The snoop queue 160 clears the flag when it receives the signal from the core 200 that it has used the data at least once (Step 2060). Thereafter, the snoop queue processes the request according to conventional techniques (Step 2070).

If the snoop queue 160 is not blocked from performing a cache coherency check based upon the request, it advances to step 2070 and processes the request according to conventional techniques.

Because of the use once feature provided in the core 200, the BSQ 140 and the snoop queue 160, a livelock condition imposes a minimal adverse effect upon processor performance. When the livelock condition occurs, the core processes all instructions that may be scheduled independently from the livelocked instruction. Once all other instructions have been exhausted, the core 200 issues the use once request. It must wait for the transaction to complete before it advances to other instructions. However, the livelock condition no longer prevents the processor from making advance progress.

The livelock detection also increases BSQ and snoop queue efficiency versus other possible livelock preventative measures. For example, livelock could be prevented by considering every request to be a use once request. However, to do so would require an increase in the depth of the BSQ and the snoop queue to maintain the same performance. The BSQ and the snoop queue would hold stored request in their respective queues until the core cleared them which, in turn, would require increased depth to achieve the same throughput. Larger BSQs and snoop queues would require more area on the chip and increase processor cost. Livelock conditions occur so infrequently, however, that the increased cost is unwarranted. By contract, the livelock detection combined with use once requests conserve area, reduce cost and effectively prevent livelock conditions.

The use once feature also imposes minimal impact on known cache coherency checking techniques in a processor. Consider systems that use the known MESI cache protocol. In such systems, when a snoop queue 160 performs cache coherency checking, it may change the status of data within the processor. For example, data that was once exclusively owned by the processor may become shared with another agent or may become invalid. Given the order of operations shown in FIG. 3, by blocking the snoop queue from performing cache coherency checks in the first instance, the present invention does not disturb other processor caches' response to the inquiries made by the snoop queue 160. Thus, the solution shown above provides an inexpensive solution to the livelock problem. For further explanation of the MESI protocol, reference may be made to the "Pentium® Pro Family Developer's Manual," Volume 1, Chapter 7 (1996).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of preventing livelock in multi-agent systems, comprising steps of:
    reading data to be processed by a first agent pursuant to a first instruction, and
    responsive to a request for the data from a second agent, determining if the first agent may process other instructions if the data were invalidated at the first agent, if not, stalling the second request until the first agent has used the data at least once.

2. The method of claim 1, wherein the stalling step includes a step of generating a snoop stall signal until the data has been used at least once.

3. The method of claim 1, wherein the first agent is a processor.

4. In a processor in a multi-agent system, the agents interconnected via an external bus, a data control method comprising:
    receiving requests for data from a processor core,
    when a livelock condition is detected in association with one of the requests, prioritizing the request,
    processing bus transactions related to the requests,
    when a second bus transaction for data related to one of the bus transactions is received, determining whether the bus transaction relates to the prioritized request,
    when the bus transaction relates to the prioritized request, stalling the second bus transaction until the processor core has used the requested data at least once.

5. The method of claim 4, wherein the processing step includes steps of, for the prioritized request:
    storing the prioritized request in a queue,
    initiating a bus transaction for the prioritized request,
    marking the prioritized request once the bus transaction is initiated, and
    receiving data from the external bus.

6. The method of claim 5, wherein the determining step includes a step of determining whether the prioritized request is marked.

7. The method of claim 5, further comprising a step of clearing the prioritized request from the queue only after the data has been used once.

8. In a processor, a method of preventing a livelock condition, comprising the steps of:
    receiving a use once request from a processor core, the request identifying data required to terminate the livelock condition,
    storing the request in a queue,
    marking the stored request to identify the request as a use once request,
    processing a bus transaction representative of the request, and
    responsive to a request from another agent for the data, stalling the request until the core has used the data.

9. The method of claim 8, wherein the stalling step continues until the data has been used in at least one micro operation in the core.

10. A method of preventing livelock in multi-agent systems, comprising steps of:
    reading data to be processed by an agent, and
    responsive to a request for the data from another agent, stalling the other agent unless the first agent may make forward progress if the data were invalidated, and
    releasing the stall when the first agent has modified the data at least once.

11. The method of claim 10, wherein the stalling step includes generating a stall signal on a portion of an external bus used for cache coherency signaling.

12. The method of claim 10, wherein the stalling step includes generating a stall signal during a portion of an external bus transaction used for cache coherency signaling.

13. A method of preventing livelock in multi-agent systems, comprising the steps of, at a first agent:
    identifying an instruction to be completed by the first agent,
    posting a first request on the external bus, the first request identifying data associated with the identified instruction,
    if a second agent posts a second request on the external bus for the same data, determining whether the first agent may process other instructions prior to completion of the first request,
    if the first agent cannot process other instructions prior to completion of the first request, stalling the second request until the first agent has completed the instruction.

14. A method of preventing livelock in multi-agent systems, comprising the steps of, at an agent:
    posting a request on an external bus related to a first instruction to be processed by the agent, the request identifying data,
    if another request invalidates the data at the agent, reposting the request related to the first instruction,
    when the agent cannot process any other instruction prior to completion of the first instruction, reposting the request related to the first instruction and, thereafter, stalling all other requests for the data until the agent has received the data and completed the first instruction.

15. A method of preventing livelock in multi-agent systems, comprising the steps of, at an agent:
    posting a first read request on an external bus the first read request identifying data of the request,
    monitoring the external bus for a second read request identifying the data, and
    stalling the second read request unless the first agent may make forward progress if the data were invalidated, and
    releasing the stall when the first agent has used the data at least once.

* * * * *

UNITED STATES PATENT AND TRADEMARK OFFICE
CERTIFICATE OF CORRECTION

PATENT NO. : 6,078,981
DATED : June 20, 2000
INVENTOR(S) : Hill et al.

It is certified that error appears in the above-identified patent and that said Letters Patent is hereby corrected as shown below:

<u>Column 15,</u>
Line 32, after "agent" insert -- ; -- (semicolon); "if" begins a new paragraph.

Signed and Sealed this

Twenty-eighth Day of June, 2005

JON W. DUDAS
*Director of the United States Patent and Trademark Office*